United States Patent [19]

Becker

[11] Patent Number: 4,614,283
[45] Date of Patent: Sep. 30, 1986

[54] DEPOSITIONING SINGLE PIECES OF GRAIN

[75] Inventor: Reinhard Becker, Oberweser, Fed. Rep. of Germany

[73] Assignee: Karl Becker GmbH & Co. KG, Oberweser, Fed. Rep. of Germany

[21] Appl. No.: 88,866

[22] Filed: Oct. 29, 1979

[30] Foreign Application Priority Data

Nov. 2, 1978 [DE] Fed. Rep. of Germany ....... 2847514

[51] Int. Cl.⁴ .......................... B65G 59/00; A01C 7/04
[52] U.S. Cl. ........................................ 221/278; 111/34; 221/200; 222/502; 222/503; 222/630; 406/136
[58] Field of Search ............... 406/136, 137, 146, 124, 406/131; 222/556, 504, 263, 630, 636, 637, 462, 517, 503, 502; 111/34, 77; 221/278, 200

[56] References Cited

U.S. PATENT DOCUMENTS

| | | | |
|---|---|---|---|
| 1,566,148 | 12/1925 | Lindsey | 222/502 |
| 2,686,083 | 8/1954 | Hampton et al. | 406/136 |
| 2,895,647 | 7/1959 | Wald, Jr. et al. | 222/504 X |
| 3,179,134 | 4/1965 | Sigrist | 222/630 X |
| 3,214,060 | 10/1965 | Stricker et al. | 221/200 |
| 3,537,624 | 11/1970 | Hartman et al. | 222/503 |
| 3,715,057 | 2/1973 | Becker | 111/77 X |
| 3,797,707 | 3/1974 | Jenike et al. | 222/462 X |
| 3,807,807 | 4/1974 | Boon | 222/503 X |
| 3,842,992 | 10/1974 | Herold | 222/502 X |

FOREIGN PATENT DOCUMENTS

| | | | |
|---|---|---|---|
| 502979 | 7/1930 | Fed. Rep. of Germany | 222/556 |
| 1216140 | 4/1960 | France | 222/503 |
| 6616816 | 5/1968 | Netherlands | 222/556 |
| 1136771 | 12/1968 | United Kingdom | 111/34 |

Primary Examiner—Steven A. Bratlie
Attorney, Agent, or Firm—Ralf H. Siegemund

[57] ABSTRACT

A seed planter is provided with a stationary, funnel-shaped bin whose lower-end extension is constructed as a pair of electromagnetically, pneumatically, or mechanically pivoted brackets, defining a duct smaller than the grain when the brackets are closed. Other seeds are blown out of the funnel while one is retained until deposited upon briefly opening the brackets.

9 Claims, 5 Drawing Figures

DEPOSITIONING SINGLE PIECES OF GRAIN

BACKGROUND OF THE INVENTION

The present invention relates to singling out and individually depositing grains such as individual seeds. Thus, the invention relates specifically, but not exclusively, to a planter.

Machines and devices are known by means of which individual grains such as seeds are placed, e.g., on the ground, a furrow, or the like, and in as accurate a mutual spacing as possible. These devices operate mechanically or by means of pneumatics. Pneumatic devices operate with suction as well as pressurized air. A single seed planter is, for example, disclosed in U.S. Pat. No. 3,715,057, now reissued. The planter, as described in this patent, includes a wheel or drum, having peripherally arranged, funnel-shaped compartments. The narrow opening of such a funnel is smaller than the smallest grain. Upon blowing air into such a compartment, one—and only one—grain is kept therein by a combination of suction and dynamic pressure; all other grains, which may have been picked up by the compartment, will be blown out again. As the drum turns, a compartment occupied by one grain is moved into a zone in which the grain is removed from the compartment and, e.g., placed onto the ground (see also U.S. Pat. No. 3,913,503). The path of the drum is particularly determined, and there are additional means to permit the grain to fall out of its compartment from one particular position only of that drum.

The above-mentioned device operates quite successfully. It was found, however, that the speed of operation, i.e., the speed of the drum, is somewhat limited. The reason for this is to be seen here in the point that a fast moving drum tends to impart a tangential movement upon the seed and, so to speak, throws the grain down. In the case of low speeds, this presents no particular problem; in the case of high speeds, the seed may easily tend to roll away, so that the various seeds are irregularly planted. The worm screw-depositing device as per my German patent No. 3,912,503 is limited in speed by the nature of its structure.

DESCRIPTION OF THE INVENTION

It is an object of the present invention to provide a new and improved device for placing or depositing single pieces of grain, such as seeds, which operates faster than a device using a rotating drum.

It is another object of the present invention to provide a new and improved planter, which places individual seeds in well-defined, mutual spacing between sequentially deposited seeds.

It is a feature of the present invention to retain the principle of retaining a single piece of grain at the bottom of a funnel whose opening is smaller than the grain, by means of air pressure and suction.

It is another object of the present invention to provide for a singling out of individual seeds without imparting thereon a tangential component of movement.

In accordance with the preferred embodiment of the present invention, it is suggested to provide a funnel-shaped construction whose lower portion is constructed as openable brackets, releasing one—and only one—grain upon opening, while air pressure and suction retain such a grain at the narrow funnel outlet as long as the brackets are closed and air pressure and flow dynamically suspend the other seeds above. At least one, preferably both, brackets of a pair are operable, e.g., by electromagnetic, pneumatic, hydraulic, or mechanical means (cam operation). Also, they should be spring-biased towards the closed position. The dynamic suspension and single-grain retention is preferably produced through an annular nozzle gap.

The preferred embodiment of the invention, the objects and features of the invention and further objects, features and advantages thereof will be better understood from the following description taken in connection with the accompanying drawings.

Figure 1:
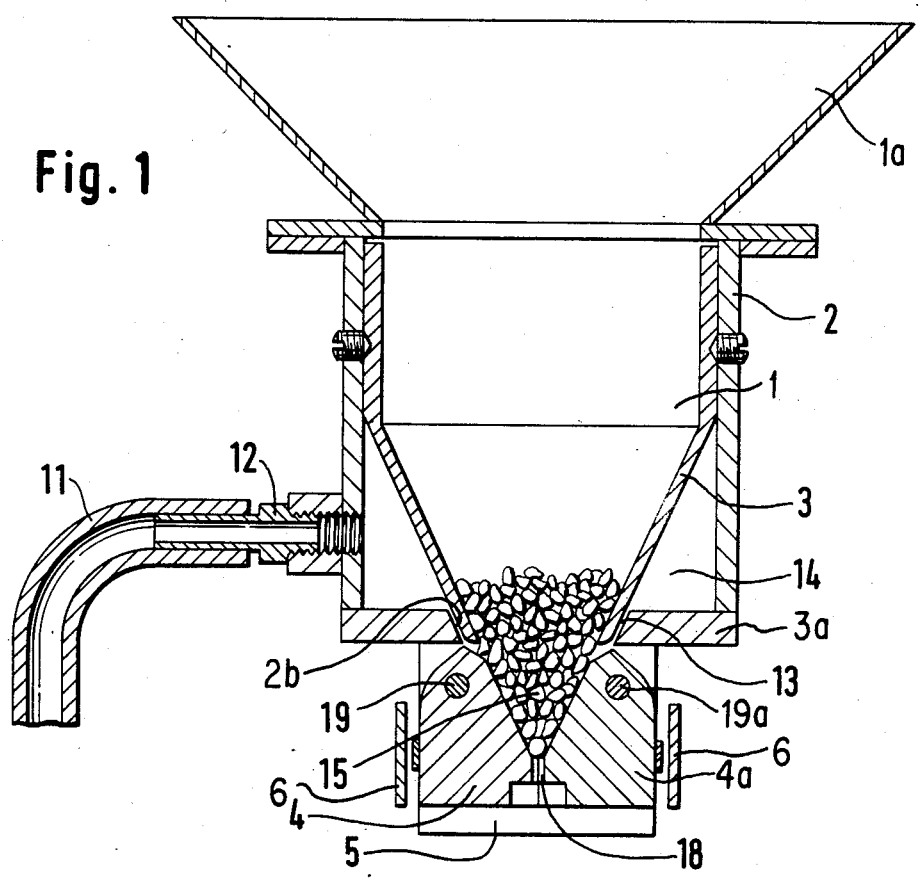
FIG. 1 is a cross section through a planter, constituting the preferred embodiment and best mode of practicing the invention.

Proceeding now to the detailed description of the drawings, the figures show a funnel-shaped entrance 1a for a hopper 1 contained in a case or frame 2. Hopper 1 is of funnel-shaped configuration, 3, in its lower part, having a bottom opening 3a.

Reference numeral 15 refers to a funnel chamber which is defined by two pivoting brackets, or bracket members 4 and 4a, respectively. These members can pivot about pins 19 and 19a, but are normally in a closed position in which they define that funnel chamber 15. This latter chamber is configured, so that it can be regarded as an extension of the tapering bottom portion 3 of bin and hopper 1. In other words, hopper 3 and closed brackets 4 and 4a together define a funnel-shaped device or funnel means. The bracket members 4 and 4a are further configured to define a narrow duct 18 when the members are in the closed position. This duct 18 is narrower than the smallest grain to be singled out.

Support members 5 extend down from the bottom of case 2, and the pivot pins 19 and 19a are anchored in and extended from the members 5, so that the bracket members 4 and 4a can be deemed suspended therefrom. Case 2, in which bin and hoppers 1 and 3 are housed, is configured to define an eddy chamber 14. Pressurized air is fed to this chamber 14 by means of a hose, conduit, or pressure line 11, via a valve 12.

Case 2 has a bottom plate 2a which, in turn, has a tapered annular opening 2b. The lower portion of hopper 3 extends into that opening. There is, however, a gap 13 between the walls of opening 2b and the hopper. This gap is of annular configuration and can be regarded as a nozzle through which air is directed towards the wall portions of brackets 4 and 4a which define funnel chamber 15.

Figure 3:
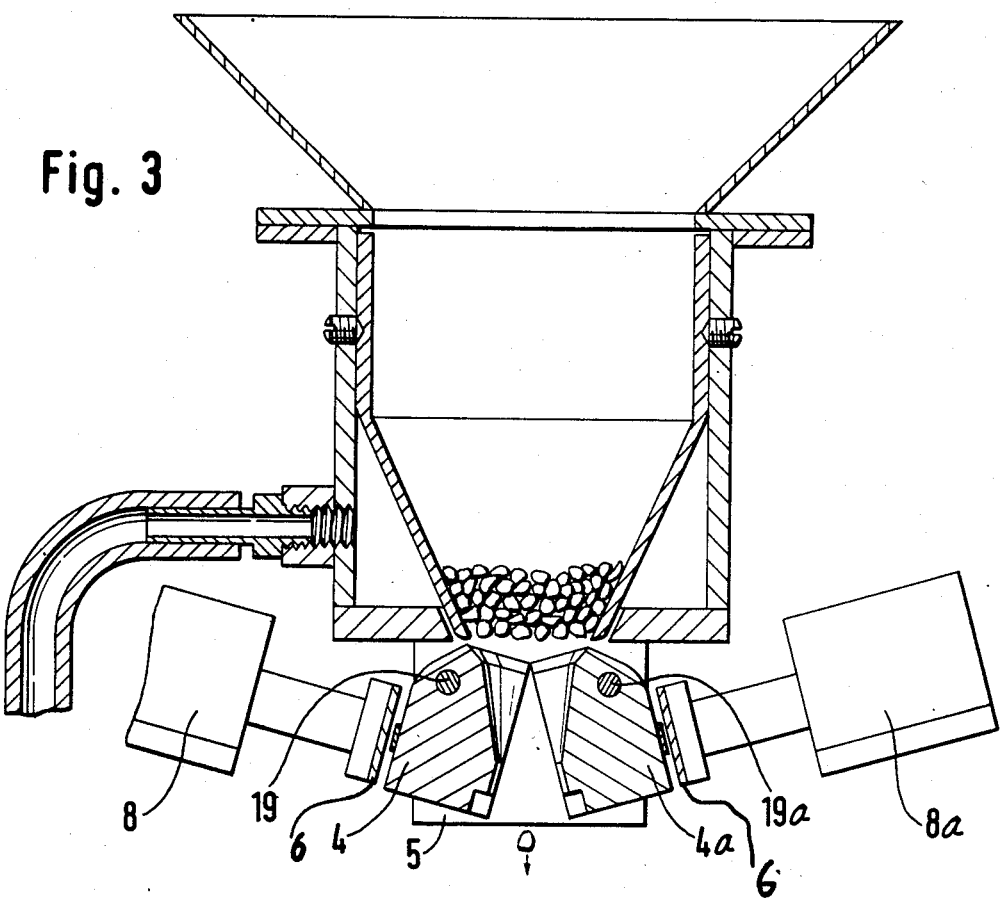
FIG. 3 is a view of the planter shown in FIGS. 1 and 2, but in an operating state, in which the singled-out seed is now deposited.

As is further shown in FIGS. 1 and 3, bracket members 4 and 4a can be pivoted by means of electromagnets 8 and 8a, whose cores, when energized, will attract armatures on the bracket members to pivot them about their pivots. The bracket members are preferably spring-biased to firmly hold the brackets together when the electromagnets are not energized. Springs 7 are shown symbolically only; they may well be incorporated in the electromagnets or solenoids.

If one assumes that air pressure is not applied to the chamber 14 (e.g., valve 12 may be shut off), and if one further assumes that grains (i.e., seeds) are placed into the hopper, these seeds will fill funnel chamber 15, and, depending upon the quantity fed to the device, the fill will extend into hopper 3. Duct 18 is too small for grains, i.e., seeds, to fall out so that, indeed, a static condition of filling is obtained.

Figure 2:
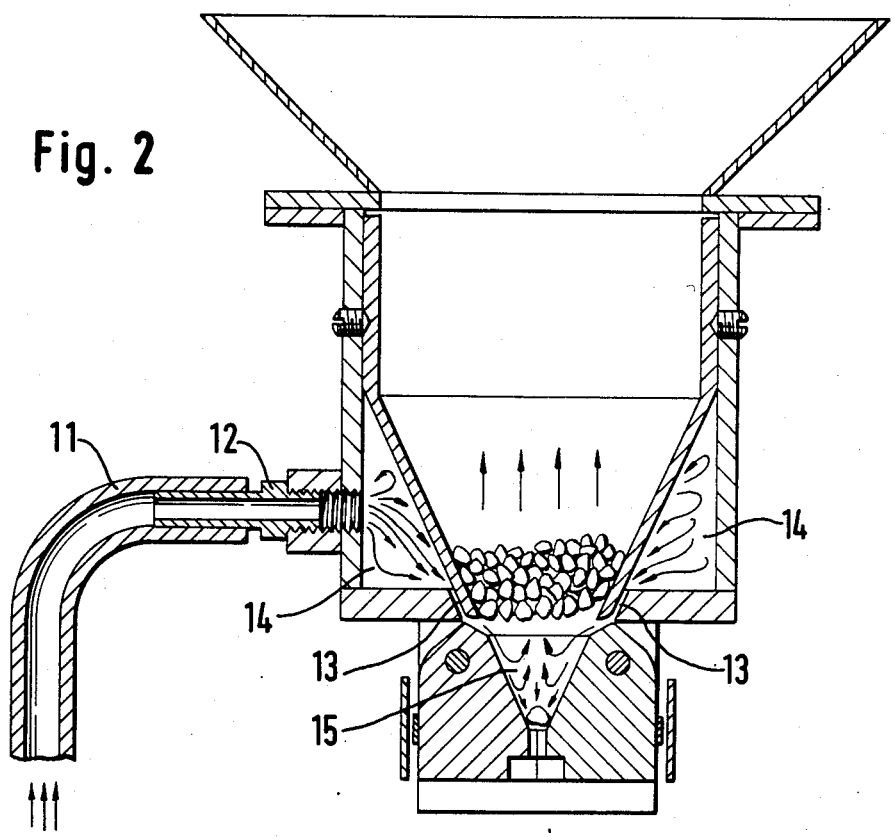
FIG. 2 is a view similar to FIG. 1, but showing the seed-singling-out process.

Turning now to FIG. 2, it is assumed here that pressurized air is applied via duct 11 to chamber 14. Thus, air will flow out of annular gap 13 as a conical, inwardly tapered jet sheet and into funnel chamber 15. Accordingly, seeds are blown out of that chamber and hover or float dynamically above chamber 15. This is particularly so when one seed blocks the air exit through duct 18, so that the air as blown down along the funnel wall will centrally rise and dynamically carry the seeds upward. However, the one grain at the bottom will not only stay above duct 18, but is retained in that position because suction pressure results in and under duct 18 as air is blown against that one grain; the central updraft of the air in chamber 15, above that one grain results in a pressure above the one grain holding it down.

FIG. 3 illustrates the next step. Upon energizing magnets 8 and 8a, bracket members 4 and 4a will pivot as indicated by the arrows, and the one grain will fall out.

FIG. 3 shows the pivot position in an exaggerated manner. Only a short stroke is needed to open funnel 15 and duct 18 just sufficiently far enough for the one grain to drop. The opening, moreover, is but a very brief one because the pressure holding the other grains up will collapse as soon as the brackets open; and they should be closed again well before any of the previously hovering grains can fall out, too.

It should be noted that in principle, just one bracket needs to be pivoted. The other one could be mounted in a stationary position; just one electomagnetic actuation would be needed in this instance. However, it will readily be seen that a single movable bracket member would have to be pivoted twice as far as two members have to be pivoted. For reasons of speed, therefore, it is desirable to use two short stroke devices rather than one long one.

The air pressure as applied may be controlled by valve 12 to shut the air off, or at least reduce the blow's pressure, when the brackets 4 and 4a open. This ON-OFF control must, of course, be synchronized with the bracket open and closing control; and that operation, in turn, is dependant upon the rate of grain depositing. The rate of grain and seed placement depends upon the speed by means of which the device is being dragged along and translates the time sequence of grain release into a grain, i.e., seed, spacing on the ground. Ultimately then, the control of the brackets and of the valve can be slaved to the speed with which the device is driven across the field.

It was found, however, that a running valve control as described is not needed. Assume pressure is continuously applied to chamber 14: as long as the brackets are closed (FIG. 2), the situation is as described. Upon opening of the brackets (FIG. 3), the one seed which blocked duct 18 partially, as long as the duct is closed, will now drop. Moreover, the air stream will reverse and will blow down also. Thus, the previous condition establishing the flow dynamic suspension of the seed bed in hopper 3 is reversed, and the seeds are actually sucked towards the ground; they will not just fall, but are moved down additionally by suction. However, the period of bracket opening is very brief; just brief enough that one grain clears the walls of duct 18. The brackets 4 and 4a will, in fact, be closed again long before any of the other grains arrives at the bottom portion; they will be caught by the bracket walls as reestablishing the funnel chamber, except that one grain will be permitted to lodge on the upper end of the reestablished duct 18. Actually, the other grains will continue to fall until that one grain is so placed to almost block duct 18, whereupon the blowing stream of air reverses in the center and empties again chamber 15, except that the one grain is retained; it will fall out, when the brackets open again, etc.

The decisive aspect of the device as described is the fact that the brackets can, indeed, be opened and closed at a very high rate. Thus, the feed rate is quite high. The bulk of the seeds will jump up and down in the hopper with closing and opening of the brackets; but always one grain will block a reestablished duct 18, whereupon the others rise again. Please note that the only movement involved in the equipment is derived from the very short strokes of brackets 4 and 4a.

Figure 4:
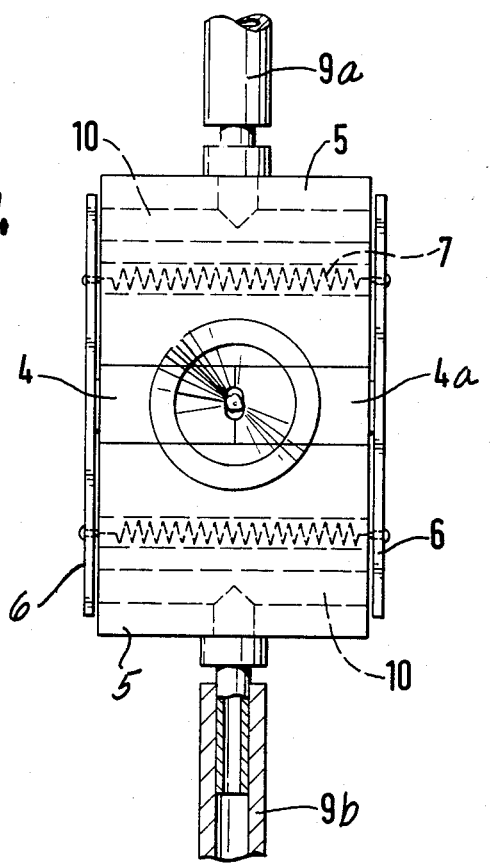
FIG. 4 is an elevational view of and into a modified construction for such a planter.

FIG. 4 illustrates a modification, avoiding the need for electromagnets and using instead the air pressure for pivoting the brackets. Air pressure is already available for the grain-singling-out operation, so that the brackets can also be made to obey pneumatic control.

The two bracket members 4 and 4a are, otherwise, constructed as described, including particularly the pivotal suspension in frame members 5. The frame members are provided with ducts 10, connected to pressure lines 9a and 9b. Springs 7, affixed to plates 6, hold the brackets together and cause these baffle plates 6 to close ducts 10. As pressure is admitted to lines 9a and 9b and pressurizes ducts 10, plates 6 are pushed in opposite directions and the brackets 4 and 4a are, thus, spread apart by that pressure, acting against the force of the springs; as soon as the pressure lines are relieved, springs 7 force the brackets back into the closing position.

Figure 5:
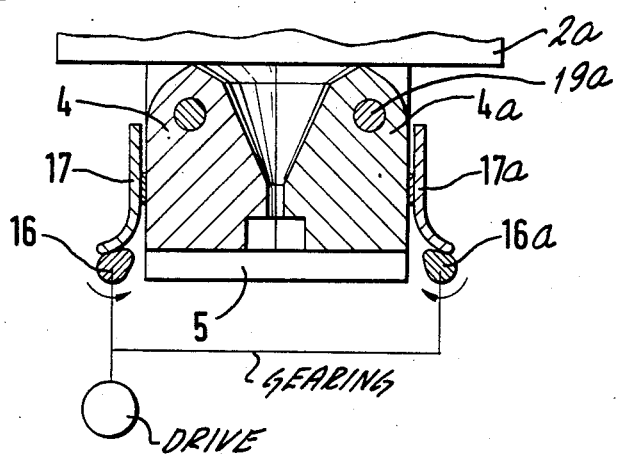
FIG. 5 is a section view of a modification for the planter shown in FIGS. 1, 2, and 3, the modification being related to the operation of brackets.

Another mode of bracket control is depicted in FIG. 5. Again, it is assumed that the bracket members 4 and 4a are forced into a closed position by means of spring 7. Each of the bracket members 4 and 4a is connected to a pivot and does actuate levers 17 and 17a, respectively. These levers are operated by means of cams 16 and 16a. In particular, the cams rotate as indicated by the arrows, and their particular radially projecting portion can cause the respective lever to pull a bracket member away from the respective other one, and vice versa.

These cams 16 and 16a provide one revolution for one bracket-opening step and are suitably driven by a drive which is, e.g., slaved or connected to the drive of the vehicle pulling the planter across the field. One may also use the air pump drive which operates the pneumatic supply or otherwise. In any event, speed control of the cams permits very accurate metering of the rate of grain (seed) depositing.

Having described three different modes of bracket operation, it will be appreciated that other mechanisms can be employed, such as hydraulic drives or pneumatic piston-and-cylinder-type drives. These drives and their valves can be controlled through plungers, cams, or the like. Thus far, it is believed that the electromagnetic drive constitutes the best mode.

The invention was described with reference to the pneumatic operation of the seed placement. The requisite pressure is produced by an air pump or compression on the vehicle on which the planter is mounted. This is clearly preferred, though the compression may be on the tractor which pulls the planter vehicle across the field. Pneumatics is, thus, clearly preferred as far as singling out of seeds is concerned. However, one could use also a liquid (e.g., water) with the same effect of retaining one seed in the bottom of the funnel and dynamically suspending the others.

The invention is not limited to the embodiments described above, but all changes and modifications thereof not constituting departures from the spirit and scope of the invention are intended to be included.

I claim:

1. Apparatus for depositing individual grains, such as seeds, comprising: a frame; storage means for the grain in the frame and having a funnel-shaped, but open, lower portion;

a pair of brackets pivotally mounted to a lower portion of the frame, underneath said storage means, said brackets, when closed, defining a funnel-shaped chamber with a narrow duct opening;

means for pivoting at least one bracket of the pair to thereby temporarily widen the duct; and means for blowing air into the chamber from above.

2. An apparatus as in claim 1, the means for blowing including annular gap means in the frame, above the brackets.

3. An apparatus as in claim 1, wherein each of the brackets of a pair is pivotally mounted, the means for pivoting acting on both brackets.

4. An apparatus as in claim 1 or 3, the one bracket or brackets being spring-biased.

5. An apparatus as in claim 1 or 4, the means for blowing acting continuously.

6. An apparatus as in claim 1 or 3, the means for pivoting being electromagnetic means.

7. An apparatus as in claim 1 or 3, the means for pivoting being pneumatic.

8. An apparatus as in claim 1 or 3, the means for pivoting including cam means acting on the one bracket or the brackets.

9. Apparatus for depositing individual grains such as seeds, comprising:

a frame;

storage means for the grains in the frame and having a funnel-shaped but relatively wide, lower portion;

means defining a funnel-shaped chamber being an extension of the funnel shaped portion and being disposed accordingly underneath said storage means and the wide, lower portion thereof, the means including at its bottom a narrow duct, being insufficiently wide for grains to fall through;

means for widening the narrow duct briefly to permit any grain above the duct and on said bottom to fall down; and means for blowing air into said chamber from above, for blowing out all but one grain, the blown-out grains hovering above the chamber while the duct is not widened.

* * * * *